F. L. SLEEPER.
CERAMIC PAINT PACKAGE.
APPLICATION FILED JULY 16, 1919.
1,326,217.
Patented Dec. 30, 1919.
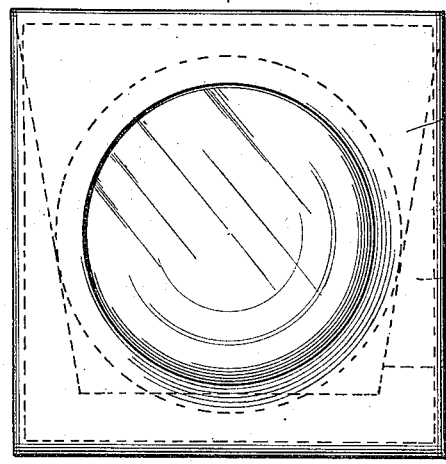
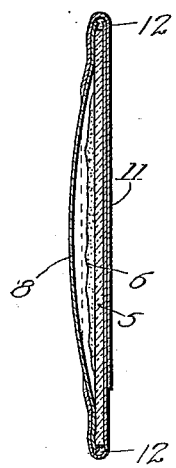
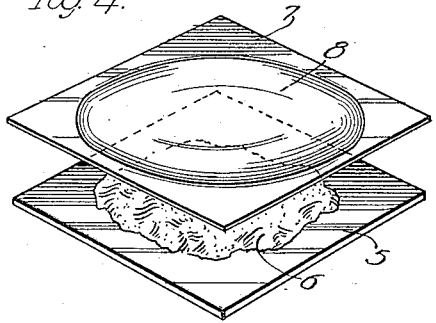
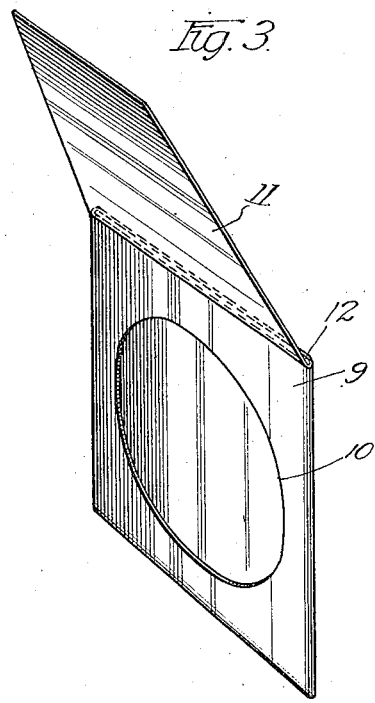
Inventor
Frederich L. Sleeper

UNITED STATES PATENT OFFICE.

FREDERICK L. SLEEPER, OF CHICAGO, ILLINOIS.

CERAMIC-PAINT PACKAGE.

1,326,217.  Specification of Letters Patent.  Patented Dec. 30, 1919.

Application filed July 16, 1919. Serial No. 311,337.

*To all whom it may concern:*

Be it known that I, FREDERICK L. SLEEPER, a citizen of the United States, and a resident of Chicago, in the county of Cook and State of Illinois, have invented certain new and useful Improvements in Ceramic-Paint Packages, of which the following is a specification.

My improved package is primarily designed to house ceramic paint and as such paint contains gold it is necessary that the package be substantially hermetically sealed. Furthermore, it is highly desirable that such a package be so designed as to permit of its contents being readily removed and replaced without the paint coming in contact with any part of the package except the base upon which it is deposited.

In my Patent No. 1,061,414 dated May 13th, 1913, I have shown and described a ceramic paint package of a somewhat similar nature as herein described but have found that by changing proportions certain parts of my former package can be omitted, which materially reduces the cost per package and yet retains all of the advantages of my former construction.

Furthermore, my improved package permits of assembling the parts more readily than my former package without the liability of having the ceramic paint come in contact with the impervious member as is frequently the case where a sealing ring is employed and the impervious member is depressed until it comes in contact with the ceramic paint when the sealing ring is applied.

In the accompanying drawing—

Figure 1 is a top view of my improved package,

Fig. 2 is a section on the line 2—2, of Fig. 1,

Fig. 3 is a perspective view of the inclosing member, and

Fig. 4 is a perspective view of the base and impervious member, in separated position.

Referring now more particularly to the drawing, a base or palette 5 consists of a vitreous material, such as glass, upon which is deposited a quantum of ceramic paint 6.

An impervious member 7, such as celluloid, of substantially the same size as the base, forms a cover for the paint and is made sufficiently convex, as shown at 8, in order to be out of contact with the paint.

As a means for holding the impervious member 7 and palette 5 together I employ an inclosing member 9 which may be of any suitable material having low tensile strength, such as paper. The inclosing member is cut to suitable form, herein shown in the shape of an envelop so as to provide a front face having an opening 10 formed therein and a flap 11 to close the slot 12. The diameter of the opening 10 is considerably less than the diameter of the convex portion 8.

In assembling the various parts the ceramic paint is first deposited upon the base and the impervious member is then placed over the paint with the paint positioned in the central portion of the palette and inwardly from the circular margin of the convex or raised portion 8 of the celluloid cover 7. The cover 7 is placed in contact with the base or palette 5 with the convex portion outermost, and the whole is then inserted into the envelop 9 through the opening 12, occupying the final position shown in Figs. 1 and 2. The opening 10 of the envelop is preferably located symmetrically with respect to the convex portion of the cover, and preferably arranged so that when the base and cover are inserted the opening will be concentric with said convex portion. Furthermore, the opening of the envelop is by preference substantially less in diameter than the diameter of the convex or raised portion 8 of the celluloid cover, with the result that the marginal portions of the opening are forced or distorted outwardly from the normal plane of the front face of the envelop and by reason of such distortion exert a uniform pressure upon the cover, adjacent the circular margin thereof, forcing the same tightly against the base or palette 5, and effecting a sealing or adhesion between these two members.

The closing of the package is completed by sealing the flap 11, in the usual manner, the package being then ready for shipment or being otherwise handled. The user upon receiving the package need only to open the envelop and withdraw the base and the cover, the latter being immediately released by this act leaving the paint easily accessible for use. Obviously, the base and cover can at any time be restored to the envelop should it at any time be desired to use the paint at another time, it being clear that the same conditions of sealing and protection as in the package when received are reproduced, hence the contents can be left for any length of time after the initial opening of the package and in proper condition, free from dust and foreign matter due to the fact that there are no sealing members broken or adhesive material destroyed when the package is opened.

By the use of a package made in accordance with my invention the paint upon the palette is completely and effectively inclosed and hermetically sealed without the use or application of adhesives or other sealing materials which would ordinarily be applied to accomplish the purpose, and which in the opening of the package necessitates the cutting or otherwise destroying the sealing or adhesive material which not only permanently destroys the seal but increases the possibility of the foreign material becoming mixed with the paint and the attendant depreciation of the quality thereof.

The production of a package of the character described, may obviously be accomplished by material modifications of the construction herein set forth, without departing from the spirit of my invention, therefore, I do not wish to be limited except in so far as the invention is specifically described in the appended claims.

I claim as my invention:

1. A package of the character described comprising a contents-carrying base, a cover of impervious material provided with a raised portion, and an envelop having an opening in one face thereof, the marginal portions of said opening bearing against said cover adjacent the edges of said raised portion.

2. A package of the character described comprising a contents-carrying base of vitreous material, a cover of impervious material provided with a centrally disposed raised portion, and an envelop adapted to receive said base and cover and having an opening in one face thereof located symmetrically with respect to said raised portion of the inclosed cover and having a size substantially less than said raised portion.

3. In a package of the character described, the combination of a contents-carrying base of vitreous material, a cover of impervious material provided with a centrally disposed circular raised portion, and an envelop adapted to receive said base and cover and provided with a circular opening in one face thereof, and arranged concentrically with respect to the raised portion of said cover when inclosed in the envelop, said opening having a diameter substantially less than that of said raised portion.

4. In a package of the character described, the combination of a contents-carrying base of vitreous material, a cover conforming substantially in size and shape to said base, and provided with a centrally disposed raised portion, and an envelop adapted to snugly inclose said base and cover, and provided with an opening in one face thereof, the marginal portions of said opening bearing on said raised portion of the cover.

In witness whereof, I hereunto subscribe my name this 11th day of July, A. D. 1919.

FREDERICK L. SLEEPER.